March 5, 1968  D. F. ILLIAN  3,371,594
BREAD TOASTER

Filed July 26, 1966  7 Sheets-Sheet 1

Inventor
Douglas F. Illian
By George F. Clark
Atty

United States Patent Office 3,371,594
Patented Mar. 5, 1968

3,371,594
BREAD TOASTER
Douglas F. Illian, Oak Park, Ill., assignor to Sunbeam Corporation, Chicago, Ill., a corporation of Illinois
Filed July 26, 1966, Ser. No. 568,051
19 Claims. (Cl. 99—329)

The present invention relates to bread toasters and more particularly relates to automatic electric bread toasters having means for lowering the bread supporting carriage to a toasting position upon insertion of the bread slice.

The automatic electric bread toaster is one of the most commonly used electric appliances in the American home today. Most of the toasters now being sold are of the so-called pop-up type in which the bread being toasted is supported on a vertically movable bread carriage. In that elevated position of the carriage, a bread slice protrudes from the housing so it may be grasped easily while in the toasting position of the carriage, the bread is positioned entirely within the toaster housing. When the toasting cycle is terminated by a timer or bread condition responsive device, the carriage is caused to move upwardly so that the bread extends outwardly through the opening in the top of the toaster housing. The heating elements in the toaster are deenergized at the same time the carriage is moved upwardly.

While the automatic raising of the bread carriage is common in most toasters currently on the market, there are relatively few toasters in which the bread and the bread carriage are lowered automatically. Most of the toasters rely on manual operation to move the toast carriage to the toasting position. One example of a prior art toaster in which the initial lowering of the toast carriage is accomplished automatically is disclosed in Koci Patent No. 2,806,422. In the toaster disclosed in the Koci patent, the mere insertion of the bread slice actuates a thermal motor which lowers the bread carriage to the toasting position. Because of the desirability of this automatic lowering feature, it would undoubtedly be demanded by most consumers if it were not for the relatively high cost of this additional feature. It would be desirable, therefore, if the automatic lowering feature could be obtained at a relatively small increase in cost.

One of the cost saving approaches to providing an automatic carriage lowering mechanism is to use the heating elements of the toaster as a thermal motor for lowering the carriage. This approach is disclosed in the above cited Koci patent. One problem introduced by this approach is the possibility of damage to the heating element through manual operation of the carriage. Because of the mechanical coupling between the carriage and the heating element, it is possible to stress the heating element beyond its elastic limit through such manual displacement of the bread carriage. It would be desirable, therefore, to provide a drive linkage between the thermal motor and the bread carriage which would eliminate this problem.

In many of the more expensive toasters now being marketed, the bread carriage is provided with few supports and is made of very light material. This construction has resulted from the fact that the rigid vertical guide posts which were formerly used to support the bread carriage were very costly in construction and were not evident to the consumer who used the toaster. There is a tendency on the part of the consumer, however, to judge the quality of a toaster by the sound and feeling derived from the bread carriage when it is operated manually. Thus, if the bread carriage is too easily depressed and makes any sort of a vibrating noise, the consumer concludes that the workmanship of the toaster is poor and that it is of a flimsy construction. As a consequence, many devices have been resorted to by manufacturers to create the impression of quality in the interior of the toaster while still including as low cost a mechanism as possible.

It is an object of the present invention to provide an improved automatic electric toaster.

It is a further object of the present invention to provide a simple and inexpensive toaster which will include means for automatically lowering the carriage to the toasting position upon insertion of a slice of bread.

It is a further object of the present invention to provide a simplified control mechanism for an electric toaster which will automatically lower the bread carriage and upon completion of the toasting cycle will raise the bread carriage and quickly cool the bimetallic control member.

It is still a further object of the present invention to provide a toaster control mechanism in which the bread actuated reset mechanism of the toast carriage is mechanically coupled to the bimetallic element for the purpose of cooling the bimetallic element and actuating the control switch.

Another object of the present invention is to provide a lightweight simple bread carriage which will be rigidly locked against displacement when the bread carriage is in the raised position.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which.

Briefly, the invention is directed to a toaster having means for automatically lowering the bread carriage upon insertion of a slice of bread into the toasting compartment. This automatic control means includes a member coupled directly to the bimetallic temperature sensing element to actuate the heating element switch initially and to cool the bimetal at the end of the toasting cycle. The automatic lowering mechanism includes a resilient element under tension between the thermal motor and the carriage supporting level. This resilient element allows the bread carriage to be depressed manually without damaging or stressing the element in the thermal motor beyond the elastic limit. In addition, means are provided on the bread carriage and on the toaster frame which engage when the carriage moves to the raised position so that the carriage will be restrained against horizontal movement while in the raised position.

Figure 1:
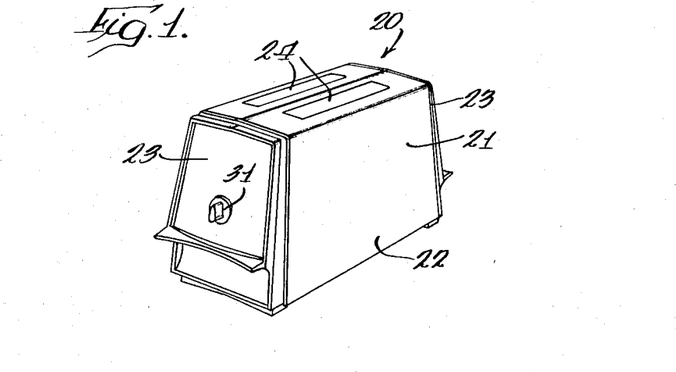
FIG. 1 is a perspective view of an automatic toaster embodying the present invention.

Referring now to the drawings, the automatic toaster generally designated by the reference numeral 20 in FIG. 1 of the drawings comprises an outer casing 21 which is made up on a central U-shaped sheet metal member 22 and a pair of plastic end panels 23. The casing 21 is formed with a pair of spaced parallel slots 24 in the upper wall thereof which provide access to the toasting mechanism 25 positioned therein. Extending through one of the end panels is a color control shaft 30 which carries on its outer end a manual control knob 31.

Figure 2:
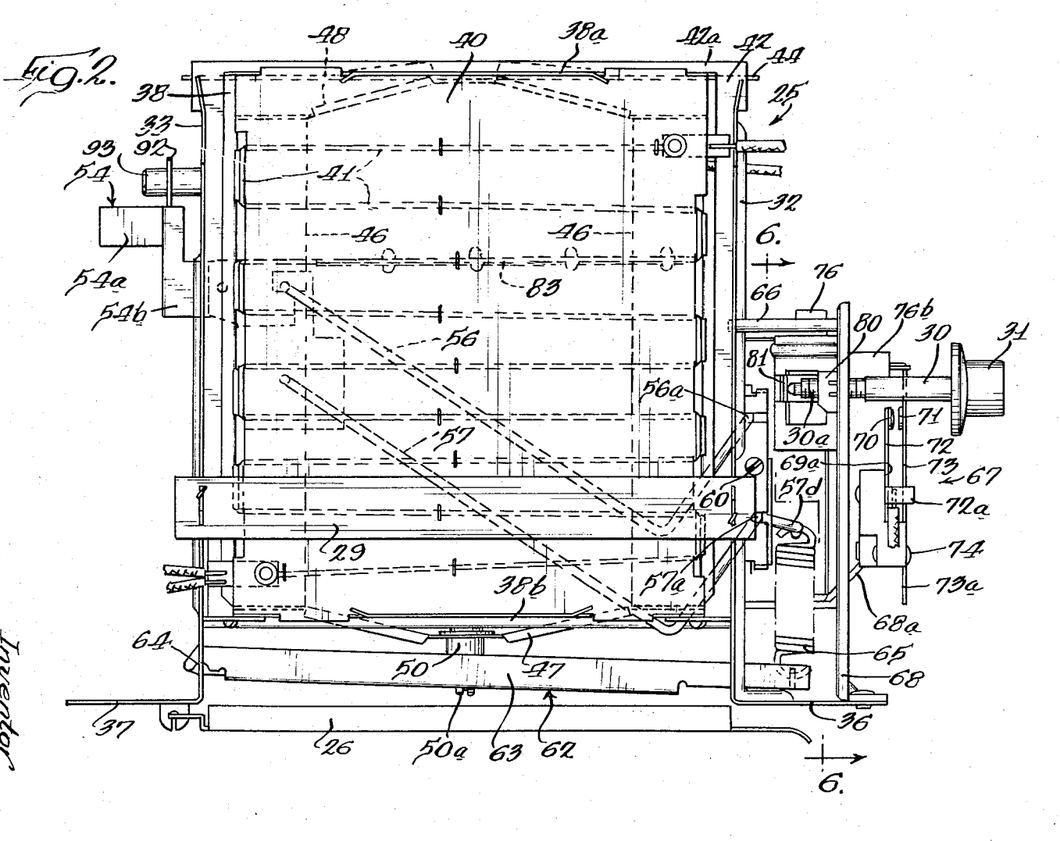
FIG. 2 is a side elevational view of the toaster of FIG. 1 with the housing removed for the purpose of better showing the mechanism of the toaster.

The toasting mechanism is supported entirely on a pair of vertically extending frame members 32 and 33. The frame members 32 and 33 are supported and interconnected by means of the central heating element and thermal motor 34, the outer heating element and bread guide assemblies 35, and a pair of support bars 29. The end frame members 32 and 33 are formed with outwardly extending base portions 36 and 37, respectively, which provide means for assembling the casing 21 to the toasting mechanism 25. As is shown in FIG. 2, a hinged crumb tray 26 is supported on the base portions 36 and 37. The crumb tray 26 and the base portions 36 and 37 form the bottom of the toaster casing 21.

Figure 8:
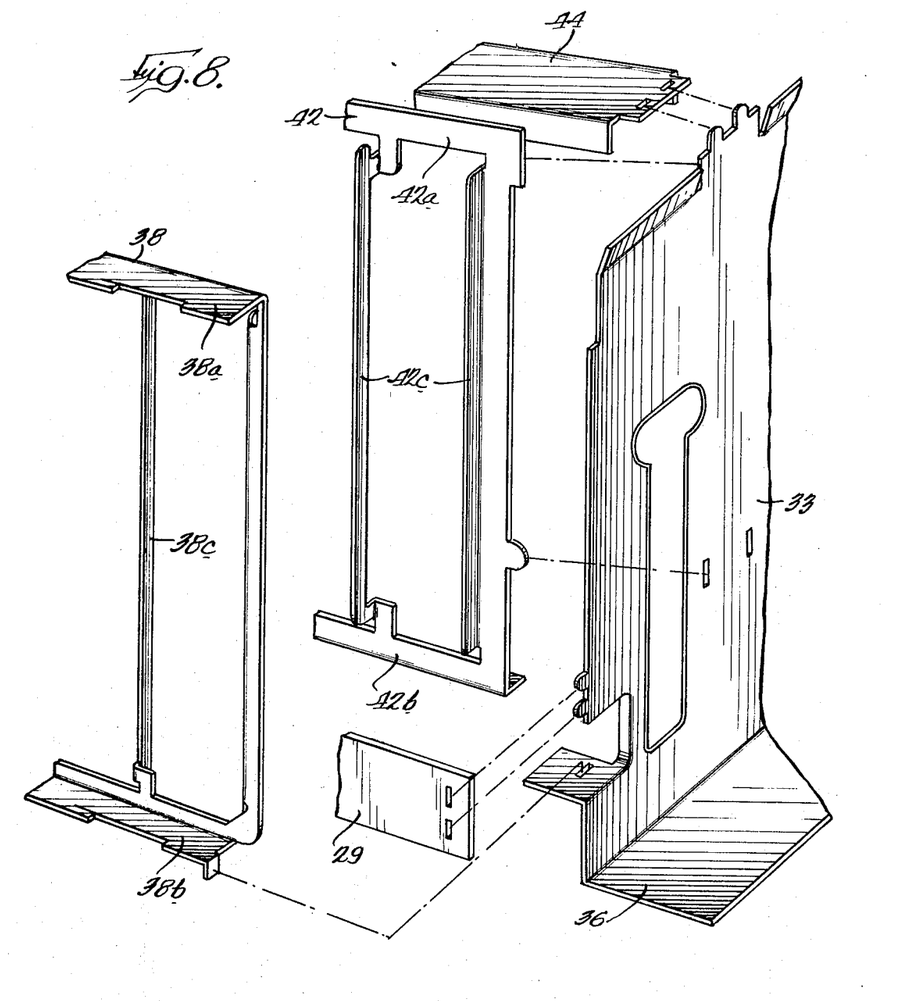
FIG. 8 is an exploded perspective view of the frame members of the toaster mechanism.
Figure 9:
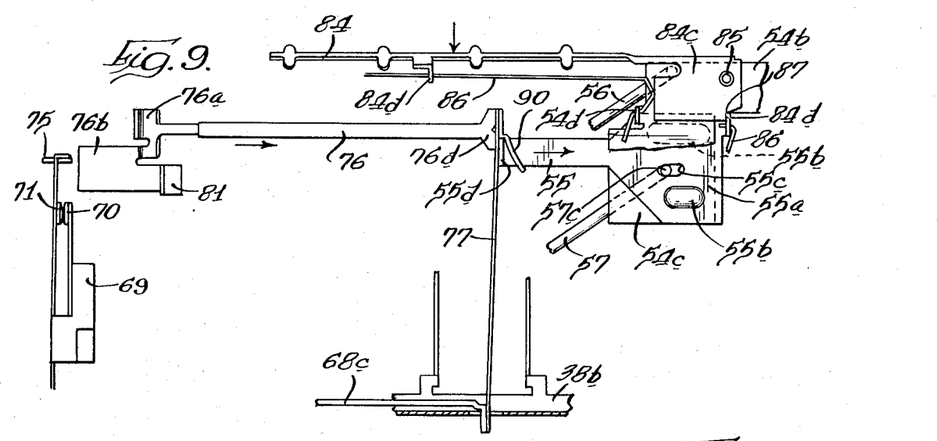
FIG. 9 is a side elevational view of the toaster control mechanism with the parts shown in the initial position occupied as the toasting cycle begins.

Each of the outer heating element assemblies 35 includes a frame member 38 having upper and lower horizontally extending portions 38a and 38b respectively which are interconnected by the vertically extending bread guides 38c as is best shown in FIG. 8. Supported between the horizontally extending portions 38a and 38b are conventional mica card type heating elements 39. The elements 39 consist of flat sheets of mica 40 on which elongated strips of resistance wire 41 are wound.

The central heating element and thermal motor 34 is similar in structure and operation to the thermal motor disclosed in the above cited Koci Patent No. 2,806,422. Positioned on either side of the thermal motor are the central bread guide members 42 which are similar to the frame members 38 having upper horizontally extending portions 42a, lower horizontally extending portions 42b and interconnecting bread guide portions 42c.

Figure 3:
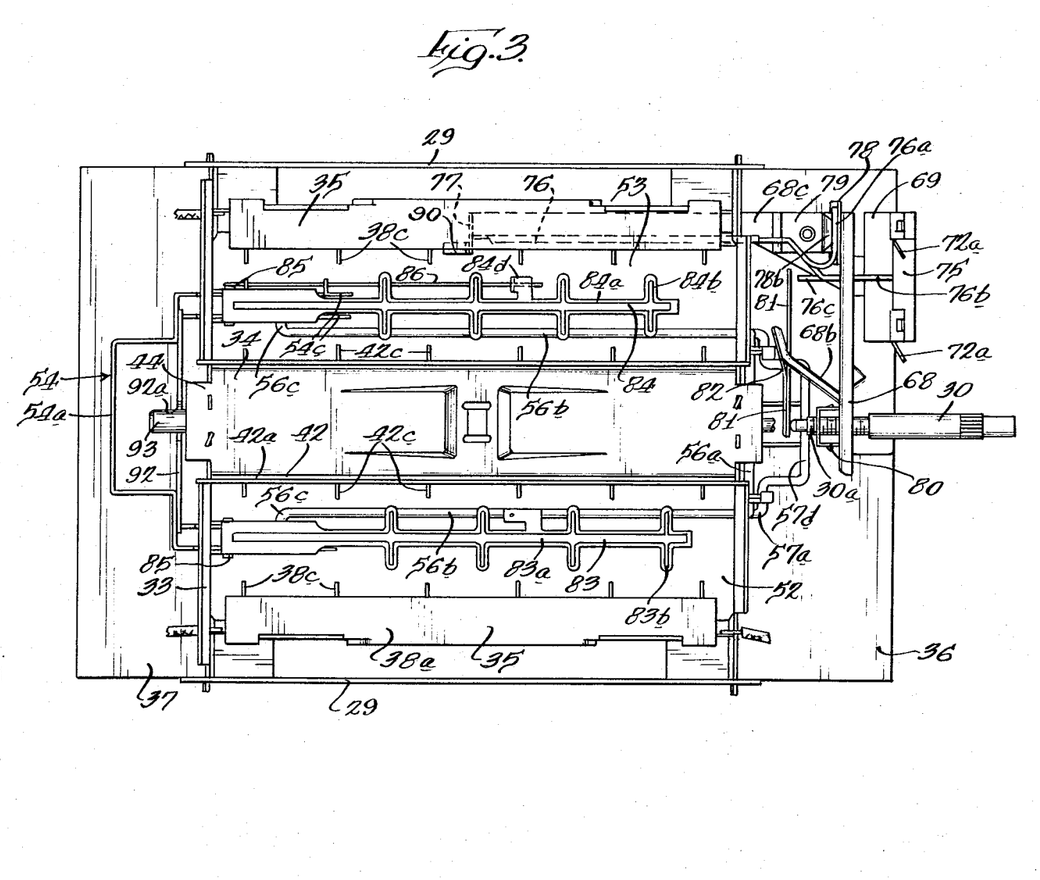
FIG. 3 is a top plan view of the toaster mechanism shown in FIG. 2.

For the purpose of rigidly supporting the central element 34 with respect to the end frame members 32, there is provided an upper channel-shaped strut 44 as best shown in FIGS. 3 and 8. The element 34 includes an elongated resistance wire 45 which is wound around a pair of spaced, vertically extending supports 46. The supports 46 are formed with insulating portions engaging the resistance wire 45 to electrically insulate the resistance wire from the frame of the toaster. The supports 46 are carried by resilient members 47 and 48 which engage the lower and upper ends of the supports 46 respectively. As is described in detail in the above cited Koci patent, the energization of the element 34 causes the resistance wire 45 to expand. The resilient members 47 and 48 are formed to bias the supports 46 outwardly thereby maintaining the resistance wire 45 under tension. As the resistance wire 45 expands allowing the supports 46 to move outwardly, the entire assembly including the supports 46 and the resistance wire 45 moves upwardly toward the supporting strut 44. The output of the thermal motor 34 is delivered through the lower drive member 50 which is best shown in FIG. 2. As the element wire 45 expands, the drive member 50 moves upwardly. An adjustment screw 50a is provided to adjust the driving connection between thermal motor 34 and the linkage to the bread carriage.

Figure 4:
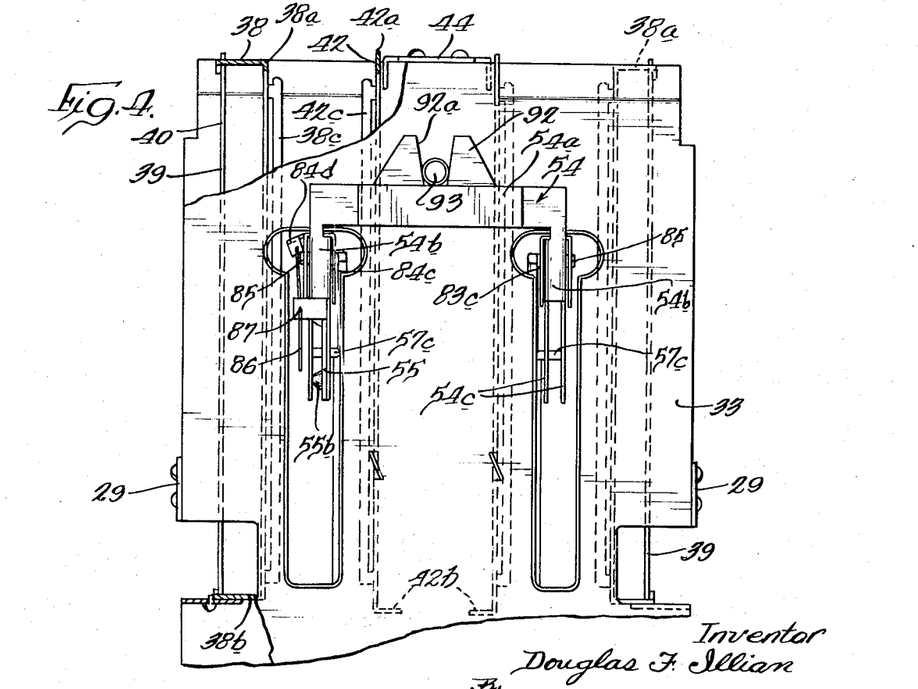
FIG. 4 is an end view in elevation of the toaster mechanism of FIG. 2 with portions of the end frame cut away to expose the interior of the toaster.

As is best illustrated in FIGS. 4 and 8, the end frame members 32 and 33 are secured together by means of frame members 38, central bread guide member 42, strut 44 and bars 29. Suitable slots and tabs are provided on these members so that assembly may be accomplished easily by engaging the slots in the tabs and bending them over. The assembly of the end frame members 32 and 33 along with the three heating elements provides a rigid structure forming a pair of spaced toasting compartments 52 and 53.

To support the slices of bread within the compartments 52 and 53, there is provided a bread carriage 54. The bread carriage 54 is made up of a yoke portion 54a which is located adjacent the outer surface of end frame member 33. In addition, the bread carriage includes a pair of base portions 54b which extend into the toasting compartments 52 and 53. Each base portion 54b includes a pair of spaced parallel wall portions 54c. In each base portion 54b, the space between the wall portions 54c serves as a guide and support for a driver 55 which is mounted for reciprocable and rotary movement with respect to the bread carriage 54. As may best be seen from FIG. 13, the carriage 54 is a single piece of stamped metal which has been formed to provide the yoke portion 54a and the two base portions 54b including their spaced wall portions 54c. The resultant carriage structure is small and requires no additional parts to connect it to the carriage supporting levers or to join the switch actuating mechanism thereto as will be more completely explained below.

Figures 7, 13:
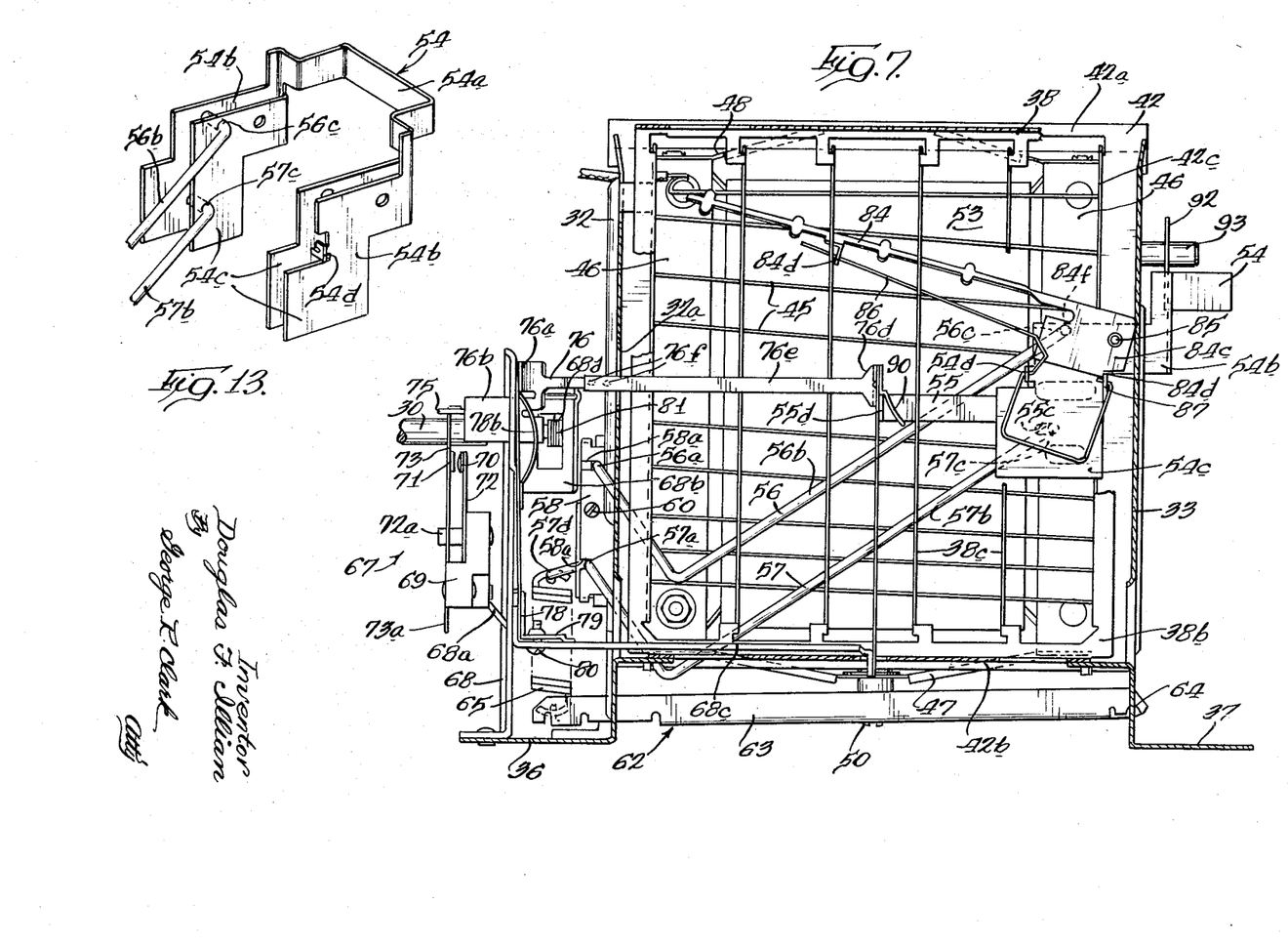
FIG. 7 is a sectional view taken on line 7—7 of FIG. 5.
FIG. 13 is an enlarged perspective view of the bread carriage of the toaster.

For the purpose of supporting the bread carriage 54 for substantially vertical movement with respect to the toasting compartments 52 and 53, there are provided a pair of generally U-shaped carriage supporting levers 56 and 57. To form a pivotal support for the levers 56 and 57, the end frame member 32 is formed with a pair of spaced, parallel, vertically extending projections 58, one of which is shown in FIG. 7. The projections 58 are formed with sidewardly extending slots 58a which receive bight portions 56a and 57a of the levers 56 and 57 thereby supporting them for pivotal movement with respect to the toasting mechanism 25. Each vertically spaced pair of slots 58a is closed by a separate bar 59 which may be retained in place by suitable assembly screws 60. As may be readily understood, the bar 59 retains the bight portions of the supporting levers 56 and 57 within the slots 58a where they are loosely supported for pivotal movement with respect to the end frame members 32.

Extending inwardly from the bight portions 56a and 57a are the carriage supporting legs 56b and 57b. As is best shown in FIG. 7, the carriage supporting legs 56b and 57b are L-shaped to provide clearance for the bread and bread supporting mechanism when the bread carriage 54 moves to the lowered position. As is evident from FIG. 3, the legs 56b are positioned within the toasting compartments 52 and 53 where they would interfere with the bread carriage and bread slices were it not for their L-shaped configuration. The outer ends of the legs 56b and 57b are formed with transversely extending projections 56c and 57c. These projections extend into vertically spaced openings in the innermost walls 54c of the bread carriage 54. The U-shaped carriage supporting levers 56 and 57 are sprung so that the carriage supporting legs 56b and 57b press outwardly against base portions 54b thereby retaining the levers 56, 57 firmly in assembled relation with respect to the carriage 54. Disassembly of the carriage supporting levers from the carriage may be accomplished simply, however, by merely springing the U-shaped legs inwardly toward the center element 34 so that they disengage from the wall portions 54c. The pivotal connection between the carriage 54 and the carriage supporting levers 56 and 57 provides a supporting arrangement in which the carriage 54 will move in an upright position along a substantially vertical path as the levers 56 and 57 are pivoted.

In order to cause the levers 56 and 57 to pivot in response to a force exerted by the heating element and thermal motor 34, a motion multiplying means is provided between the drive member 50 of the thermal motor and the carriage supporting lever 57. This motion multiplying means includes a horizontally disposed lever 63 which comprises an upwardly facing channel shaped member pivotally supported at a fulcrum or edge 64 formed on the end frame member 33. The other end of the lever 63 extends through an opening in the end frame member 32 and is connected adjacent the outer face of frame member 32 to a helical spring 65 which transmits tension to the lever 57.

The bight portion 57a of the U-shaped carriage supported lever 57 is formed with a displaced portion 57d which extends outwardly from the pivotal supporting portions 57a to provide a small lever arm through which the force of the thermal motor 34 may be applied to the carriage supporting lever 57. The upper end of the helical spring 65 is hooked over the displaced portion 57d to provide the force which controls the position of the bread carriage 54. Thus, the motion multiplying means 62 includes the lever 63 which is acted upon at its midpoint by the drive member 50 of the thermal motor 34, the spring 65 and the lever arm are formed by the displacement portion 57d. A relatively small displacement in the drive member 50 will, therefore, cause several inches of movement of the bread carriage 54.

The purpose of the spring 65 is to prevent damage to the thermal motor 34 and particularly the element wire 45 as a consequence of the carriage being displaced downwardly by a manual operation. The positioning of the bread carriage 54 and the force exerted by the thermal motor 34 in raising the bread carriage is determined by the length of the element wire 45 and the position of adjustment means 50a. If the carriage 54 is forced down manually, the element wire 45 may be stressed beyond its elastic limit and, therefore, permanently stretched creating a condition in which the thermal motor may not be able to move the carriage to the raised position without at least further changes in adjustment means 50. The spring 65 is of such strength that it is stretched, thereby accommodating the manual lowering of the carriage without stressing or damaging the thermal motor 34 or its element wire 45.

Figure 5:
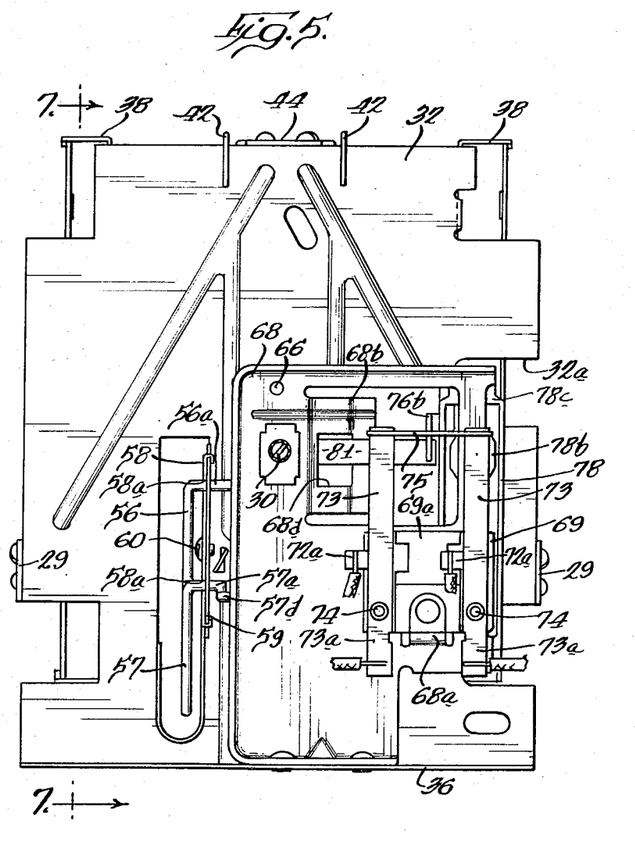
FIG. 5 is a right end view of the toaster mechanism of FIG. 2.

In order to initiate operation of the toaster including energization of the heating elements, there is provided a double pole switch 67 which is connected across both sides of the two conductor powered supply cord in a manner well known in the art. The switch itself is carried by a vertically extending plate 68 which is parallel to and spaced outwardly from the end frame member 32. The plate 68 is secured to the base portion 36 of the plate 32 and is formed with a laterally extending projection 68a to which is secured a contact supporting ceramic block 69. The block 69 supports two fixed contacts 70 and two movable contacts 71 which cooperate to form the two sets of contacts. The fixed contacts 70 are carried by switch members 72 which are mounted on the stepped portion 69a of the supporting block 69. Each of the members 72 is formed with a laterally extending tab 72a to which the power supply conductors are connected. Spaced from and extending parallel to the switch members 72 are flexible contact supports 73 which carry the contacts 71 adjacent their upper ends. The flexible contact supports 73 are secured to the ceramic block 69 by rivets 74 adjacent their lower ends. Extending below the block 69 are contact connecting portions 73a on the supports 73 which provide means by which the electrical connections are made between the serially connected heating elements and the movable contacts 71. The insulated conductors for the heating elements are merely welded to the connecting portions 73a as is best shown in FIG. 5.

In order to actuate the switch 67 and more specifically the contact supports 73, there is provided an insulated connector 75 which is supported by the upper ends of the contact supports 73. The insulated connector 75 is adapted to be engaged by an actuator 76.

Figure 6:
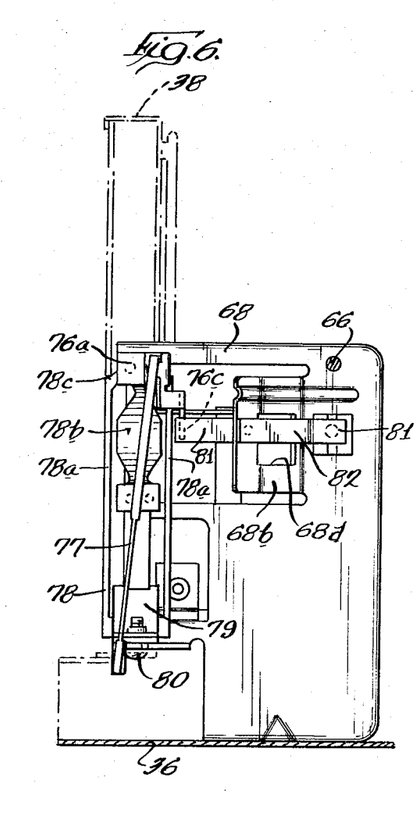
FIG. 6 is a sectional view taken on line 6—6 of FIG. 2.

The switch actuator 76 is an elongated member which extends through a slot or cutout 32a in the end frame member 32 into the toasting compartment 53. The inner end of the actuator 76 is supported by the upper end of a bimetal or bimetallic temperature sensing element 77. The switch actuator 76 is supported intermediate its ends by a snap acting element 78 best shown in FIG. 6. The snap acting element 78 is conventional in form comprising a pair of elongated outer tension members 78a and a central bowed portion 78b. The lower end of the snap acting element 78 is secured to the switch supporting plate 68 by means of an L-shaped clamp 79 which is retained by an assembly screw 80. The lower end of the bowed portion 78b is welded at 81 to the switch supporting plate 68. The upper end of the snap acting element 78 includes a portion 78c which interconnects the outer legs 78a and the bowed portion 78b; portion 78c is secured to a transversely extending projection 76a formed on the actuator 76. The snap acting element 78 as assembled to the switch supporting plate 68 and the actuator 76 has two stable positions, one as shown in FIG. 7 with the connecting portion 78c against the switch supporting plate 68 and another in which the upper end of the snap acting element has moved over-center and is displaced inwardly toward the bimetal 77. In the last mentioned position, the two pairs of contacts including the fixed contact 70 and movable contact 71 are closed. In the first mentioned position as shown in FIG. 7, the actuator 76 is positioned with an outer end portion 76b in engagement with the insulated connector 75. In this position, the actuator 76 holds the two sets of contacts open as shown in FIG. 7.

In order to provide color control for the toasting mechanism 25 and to regulate the point at which the switch 67 snaps to the open position, a color control is provided including the aforementioned knob 31 and the rotatable shaft 30 which is actuated by the knob 31. The inner end of the control shaft 30 is threaded at 30a and is threadedly received in a mounting bracket 80 which is secured to the supporting plate 68 as is best shown in FIGS. 2 and 3. The bracket 80 serves to threadedly support the shaft 30 so that it may readily be rotated but will remain in any selected position of adjustment. The inner end of the shaft 30 engages a rockably mounted link 81. The link 81 is supported for pivotal movement by means of a leaf spring 82 which is secured to an inwardly formed projection 68b on the supporting plate 68. As may best be seen in FIGS. 6 and 7, the inward projection 68b is formed with an opening 68d through which the link 81 extends.

The end of the link remote from the control shaft 30 is positioned to engage a stepped projection 76c extending in the opposite direction from the portion 76b as best shown in FIG. 3. When the snap acting element 78 is moved to the position in which the switch contacts are closed, the distance over center which the actuator 76 may move in a direction toward the bimetal 77 is determined by the engagement of the projection 76c with the rockable link 81. Thus, if the color control shaft 30 is advanced inwardly, the rockable link 81 will be positioned so that the snap acting element 78 will not be able to move very far past the over-center position when the switch contacts are closed. This, of course, would be a control position for light toast. If the control were threaded outwardly so as to move the end of link 81 adjacent the switch 67 inwardly, the snap acting element would move well past its over-center position thereby requiring more heat to actuate the switch with a result that darker toast would be produced.

The bimetal or bimetallic element 77 is supported at its lower end on a horizontally extending leg 68c formed integrally with the switch supporting plate 68. The bimetal 77 is welded or braised to the downwardly turned end of the leg 68c. With the bimetal 77 and the switch 67 and the color control shaft 33 all supported on a common plate 68, the control mechanism is easy to calibrate and will not be adversely affected by temperature expansion in the other parts as the toaster heats up. To make the assembly rigid with respect to the end frame member 32, a post or brace 66 is assembled between the upper end of plate 68 and the frame member 32.

At its upper end, the bimetal 77 is secured to the actuator 76 through a somewhat Y-shaped portion 76d. The actuator 76 is made up of heavy gage metal forming the part exterior to the toasting compartment 53, while the portion within the toaster designated as 76e is formed of very light gage metal to minimize the heat loss between the upper end of the bimetal and the portions of the mechanism exterior to the toasting compartment 53. As is shown in FIG. 7, the light gage portion 76e is welded to the exterior portion of the actuator 76 at 76f.

The purpose of the Y connection at 76d is to provide restraint of the end of the bimetal 77 against deflection. The side of the bimetal toward the switch 67 is the high expansion side. As is evident from FIG. 3, the bimetal 77 is positioned within the toasting compartment 53 so as to be close to the surface of a piece of bread supported therein for toasting. It may be appreciated that the position of the bread will be determined largely by the position of the bread guides 38c and 42c. The specific mode of operation of the bimetal in providing a self-compensating response to the radiation from the bread is not a part of the instant invention. The primary response is given by the upper portion of the bimetal 77 while the lower portion produces a compensating motion. The patent to Koci No. 2,332,518 explains in detail the mode of operation of the end restrained bimetal such as 77 in producing the temperature response which automatically compensates for changes in the ambient temperature and environment of the bimetal. For the purpose of this application, it is only necessary to understand that as the bimetal 77 is heated during the toasting of the bread, the upper end of the bimetal causes the actuator 76 to move in the direction of the switch 67 thereby moving the snap acting element 78 over center and causing the switch contacts 70, 71 to open.

For the purpose of supporting toast within each of the toasting compartments 52 and 53, there are provided bread supports 83 and 84 for the toast compartments 52 and 53 respectively. The bread supports are substantially identical in shape, each having an elongated truss member 83a and 84a with laterally extending legs 83b and 84b respectively. The bread supports are connected to the carriage 54 by bases 83c and 84c which are channel shaped portions within which the base portions 54a of the bread carriage 54 are received as is best shown in FIG. 4. The bread supports 83 and 84 are secured to the base portions of the bread carriage by means of pins 85 which are received in aligned openings in the adjacent parallel walls 54c of the carriage base portions 54b and the channel shaped bases 83c and 84c.

The bread support 83 in the toasting compartment 52 is positioned horizontally and is restrained against movement about the pin 85 by virtue of the engagement between the supporting protuberance 56c and a slot in the base 84c.

The bread support 84 in the toasting compartment 53 is mounted so that it may have limited pivotal movement about the pin 85. The base 84c of the bread support 84 has an enlarged slot on the side which engages the protuberance 56c thereby permitting the bread support 84 to move through an angle of approximately 20°. To bias the bread support 84 to the raised position shown in FIG. 7, there is provided an elongated spring 86 as may be seen in FIG. 7 which defines a somewhat dipper shaped outline. The elongated end of the spring 86 which might be called the handle is restrained or supported through insertion into a hole in a formed bracket 84d extending downwardly from the bread support 84. The ladle portion of the spring 86 is restrained by projecting brackets 54d on the base of the bread carriage 54 and bracket 87. As formed and held in the position shown, the spring 86 exerts an upward force against the bread support 84 so that it moves to the limit permitted by the slot 84f and the mounting projection 56c on the supporting lever 56. The spring 86 is of such strength that the weight of a slice of bread on the bread support 84 will cause the bread support to rotate to its horizontal position.

To provide a means for interrelating the pivotally mounted bread support 84 or lever with the switch 67 to start the toasting cycle when a slice of bread is inserted, the driver 55 is mounted on the bread carriage 54 for reciprocating and rotating movement. The shape of the driver 55 and the manner in which it cooperates with the adjacent parts of the mechanism are best shown in FIGS. 9, 10, 11 and 12. The driver 55 has an enlarged mounting portion 55a which is received between the spaced wall portions 54c within the toasting compartment 53. To provide a snug, sliding fit for the enlarged mounting portion 55a between the spaced wall portions 54c, dimpled portions 55b are formed in the driver 55. At approximately the center of the enlarged mounting portion 55a, the driver is formed with a horizontally extending slot 55c. The slot 55c is designed to receive the supporting projection 57c provided on the lower of the two carriage supporting levers. The spaced wall portions 54c and the projection 57c provide an arrangement in which the driver 55 may be pivoted and reciprocated to some extent.

The above-mentioned spring bracket 87 to which the end of the spring 86 is hooked is a laterally extending projection on the driver 55. The spring 86 is formed to exert a biasing force upwardly and to the left on the driver 55 as viewed in FIGS. 7 and 9–12.

The driver 55 and the bread support 84 are formed with interengaging portions including the spring bracket 87 and a stepped shoulder 84d on the lower edge of the bread support 84. As is best shown in FIG. 7, the driver 55 is urged to the left by the spring 86 so that the mounting projection 57c is at the right hand end of the slot 55c. In this position, the bracket 87 on the driver 55 rests in engagement with the stepped shoulder 84d. When a piece of bread is inserted into the toasting compartment 53, the parts assume the position shown in FIG. 9; the bread support 84 has been rotated downwardly to a horizontal position pivoting about the pin 85. As the support 84 rotates, the stepped shoulder 84d moves to the right as viewed in FIG. 9 causing the driver 55 to be moved to the right by virtue of the engagement between the shoulder 84d and the bracket 87.

The end of the driver adjacent the bimetal 77 is formed with a shoe portion 55d which extends at 90° to the remainder of the driver 55 and in a plane parallel to that of the bimetal. Secured to the upper end of the bimetal is an angularly extending latch 90 which serves to hold the shoe portion 55d against the bimetal 77 and permits the driver to draw the bimetal 77 and the actuator 76 to the right as viewed in FIG. 9. Thus, as the driver 55 is moved to the right by virtue of a bread slice causing rotation of the bread support 84, the actuator 76 moves to the right causing the snap acting element 78 to move over center and thereby closing the contacts 70, 71.

Figures 10, 11:
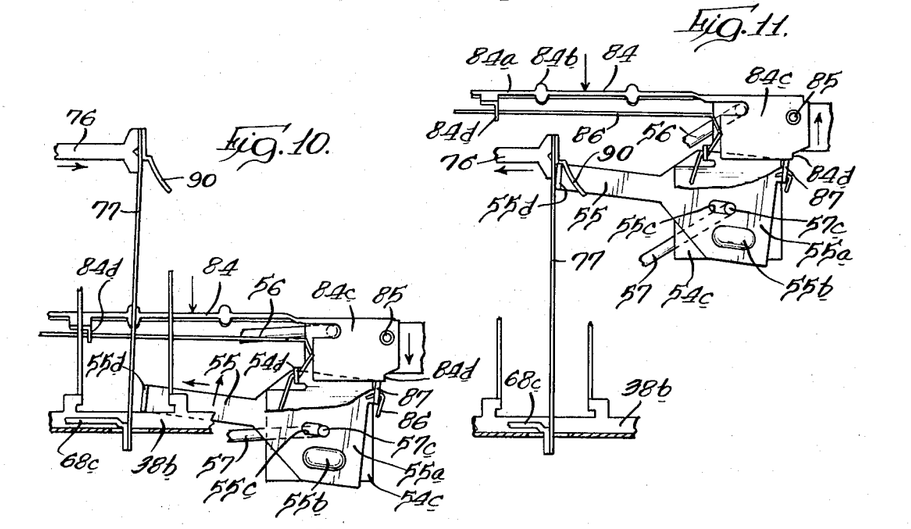
FIG. 10 is a side elevational view of the control mechanism similar to FIG. 9 but with the toast carriage in the lowered position and with the switch mechanism cut away.
FIG. 11 is similar to FIG. 10 but shows the toast carriage in the raised position at the end of the toasting cycle.
Figure 12:
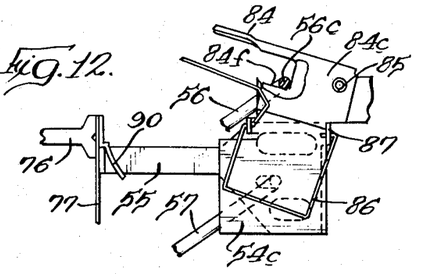
FIG. 12 is a fragmentary view of the control mechanism with the bread actuated lever shown in the initial position it occupies prior to inserting a bread slice.

With the contacts 70, 71 closed, the heating elements will be energized and the thermal motor 34 will operate through the motion multiplying means 62 to cause the carriage supporting levers to lower the bread carriage 54. As the bread carriage moves downwardly, the driver 55 is disengaged from the bimetal 77 and the latch 90. When the carriage approaches its lowermost position as shown in FIG. 10, the shoe portion 55d of the driver 55 engages the lower frame member 38b causing the driver 55 to be rotated clockwise around the supporting projection 57c as is best illustrated in FIG. 10. This rotation disengages the bracket 87 from the stepped shoulder 84d on the bread support thereby permitting the driver 55 to move to the left as viewed in FIG. 10 under the influence of spring 86. It should be noted that the mounting projection 57c is now at the right end of the slot as compared to its position in the left end of the slot when the carriage moves downwardly with engaging parts 84d and 87 latching the driver in the retracted position for closing the switch 67.

As the heating elements toast the slice of bread in the toasting compartment 53, the top of the bimetal 77 deflects to the left as shown in FIG. 11 until such time as it passes the center point for the snap acting element 78, at which time, the actuator 76 moves quickly into switch opening engagement with the insulated connector 75. With the switch 67 open, the heating elements are de-energized and the thermal motor 34 causes the carriage 54 to be elevated as the element wires 45 contract. As shown in FIG. 11, the carriage moves to the elevated position with the shoe portion 55d of the driver 55 engaged behind the latch 90. When the cooked toast is removed from the bread support 84, the support rotates upwardly to the position shown in FIGS. 7 and 12, thus positioning interengaging parts 84d and 87 so that introduction of a new piece of bread will again close the switch 67 and start the toasting cycle over again.

One other function performed by the driver 55 at the end of the toasting cycle is that of cooling the bimetal 77. When the carriage moves upwardly to the position shown in FIG. 11, the relatively cool driver and its shoe portion 55d directly engages the hot bimetal 77 and tends to drain heat from it, thereby lowering its temperature and placing it in condition to start another toasting cycle. Without some means for reducing the temperature of the bimetal, it is impossible to begin a second toasting cycle soon after the first cycle has been completed. The bimetal would still be bowed to such an extent that it would immediately open the switch 67 as soon as it was released by the driver. According to the present invention, a simple and effective means has been provided to couple the bread actuator lever or support 84 to the switch 67 through the driver 89 and the actuator 76. This same coupling mechanism performs the function of cooling the bimetal so that it may be in condition to toast a second slice of bread quickly.

Since the bread carriage 54 is supported only by the relatively light V-shaped carriage supporting levers 56 and 57, there would be a tendency for the carriage to seem loose and insecure in its relationship to the toasting mechanism 25. In order to overcome this undesirable situation and still make use of a relatively inexpensive carriage supporting mechanism, there is provided a carriage locking plate 92 which is secured to the yoke portion 54a of the carriage 54 as is best shown in FIGS. 3 and 4. The carriage locking plate 92 is orientated in a vertical plan and is formed with an upwardly facing V slot 92a. To secure the carriage against movement in a horizontal direction when the carriage is in its raised position, a projecting post 93 is mounted on the end flame member 33. The projecting post 93 is positioned to be received in the apex of the V slot 92a when the carriage 54 is in the raised position. This more or less jamming engagement between the post 93 and the slot 92a locks the carriage so that there is no tendency for it to rattle or be displaced when the toaster is transported, examined or otherwise moved by a user or a perspective customer.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. An automatic self-lowering toaster comprising a housing, spaced heating elements within said housing, a bread carriage movable between a raised position in which a piece of bread on the carriage protrudes from said housing and a lowered position in which said piece of bread is positioned between said heating elements, a thermal motor, linkage means interconnecting said carriage and said thermal motor to move said carriage to the lowered position on energization of said thermal motor, and means actuated by a slice of bread placed on said carriage to energize said thermal motor, said linkage including a resilient element which permits said carriage to be operated manually from said raised position to said lowered position independently of said thermal motor.

2. The automatic toaster of claim 1 wherein said thermal motor includes loops of resistance wire through which electricity is passed to heat the wire and thereby cause movement of said carriage, and said resilient element comprises a helical spring through which force is applied to move said carriage in response to expansion and contraction of said wire.

3. The automatic toaster of claim 2 wherein said linkage means comprises a pair of levers interconnected by said helical spring whereby expansion of said wire moves one of the levers of said pair causing said carriage to be lowered through the connection of the other of said pair of levers with said carriage.

4. The automatic toaster of claim 1 wherein said thermal motor includes the resistance wire of at least one of said heating elements, said resistance wire being wound on a pair of spaced supports, a pair of parallel levers pivotally connected to said frame and said carriage to support said carriage for vertical movement, motion multiplying lever means interconnecting said spaced supports and said parallel levers to move said carriage downwardly as said resistance wire is heated and upwardly as wire is cooled, and a helical spring connected to the ends of two levers in said motion multiplying lever means to transmit force between them.

5. The automatic self-lowering toaster of claim 1 wherein said bread carriage and said frame are provided with means which interengage as the carriage moves to the raised position to lock said carriage rigidly against horizontal displacement.

6. In an automatic toaster of the type including bread actuated means for initiating the toasting cycle, a toaster control means comprising a frame, an elongated bimetal supported at one end on said frame, an axially movable switch actuator connected to the other end of said bimetal, a snap acting switch connected to said actuator and having contacts which are open in one stable position of said switch and closed in the other stable position of the switch, said bimetal responding to the temperature of a piece of bread being toasted to open said switch to terminate the toasting cycle when the bread is toasted to a selected degree, a bread support having bread actuated means for closing said contacts when bread is placed on said support, a driver connected to said actuated means to engage said bimetal to cool said bimetal at the end of each toasting cycle, and latch means interconnecting said driver and said bimetal during the commencement of the toasting cycle, said bread actuated means operating through said driver and said latch means causing said bimetal and switch to close said contacts.

7. The toaster control of claim 6 wherein said bread support is movable from a raised position to a lowered toasting position, said latch means interconnecting said driver and said bimetal only when said bread support is in the raised position.

8. The toaster control means of claim 7 wherein said bread support comprises a bread carriage movable between a raised and a lowered position, a thermal motor connected in series with said switch, and linkage means interconnecting said carriage and said thermal motor to move said carriage to said lowered position when a piece of bread is placed on said bread support, said linkage including a resilient element which permits said carriage to be operated manually from said raised position to said lowered position independently of said thermal motor.

9. The toaster control means of claim 6 wherein said bread support includes a movable carriage and said bread actuated means comprising a bread supporting lever which is pivotally connected to said carriage, means supporting said driver for rectilinear and pivotal movement, interengaging parts on said bread supporting lever and driver which reciprocate said driver on initial actuation of said bread supporting lever by a bread slice thereby causing said switch contacts to close, spring means urging said driver toward said bimetal, means on said driver which engage said frame to rotate said driver causing said interengaging parts to disengage and allowing said spring to move said driver into engagement with said bimetal.

10. The toaster control of claim 9 including means for lowering said carriage upon the closing of said contacts, said means on said driver engaging said frame upon the movement of said carriage to a lowered position, and said driver engaging said latch means on said bimetal only when said carriage moves to its elevated position.

11. The toaster control of claim 6 wherein said bread support includes a bread carriage movable between an elevated and a lowered position, a bread supporting lever pivoted to said carriage and spring biased to an upper position, the weight of a piece of bread causing said lever to pivot downwardly, said driver being supported on said carriage for reciprocable and rotatable movement, spring means biasing said driver lengthwise toward said bimetal, interengaging parts on said bread supporting lever and said driver which move said driver in a direction away from said bimetal upon rotation of said lever by a bread slice, and means on said frame engaging said driver when said carriage moves to the lowered position to rotate said driver and disengage said interengaging parts whereby said driver moves toward said bimetal under the force of said spring means, said bread supporting lever rotating to said upper position upon removal of said bread slice and thereby reengaging said interengaging parts.

12. In an automatic toaster of the type having a bread carriage movable between an elevated bread loading position and a lowered toasting position, the combination comprising a frame supporting spaced heating elements which form at least one toasting compartment, a bread carriage support lever means pivotally connected to said frame at one end of said toasting compartment to support said carriage for vertical movement in said toasting compartment, and interengaging means on said carriage and said frame to lock said carriage against horizontal displacement in the raised position.

13. The combination of claim 12 wherein said interengaging means comprise a horizontally extending rod and a complementary part having a V-slot symmetrical about a vertical axis, said rod and part being positioned to mutually engage with said rod seated in the apex of said slot as said carriage moves to the raised position.

14. The combination of claim 12 wherein said frame and heating elements provide two adjacent toasting compartments and said lever means comprises a pair of substantially parallel U-shaped members pivoted at their bight portions with the free ends of the legs of said members being pivotally connected to said carriage, said interengaging parts being positioned at the end of said carriage adjacent the pivotal connection with said members.

15. The combination of claim 14 wherein said interengaging part on said carriage comprises a plate having an upwardly facing V-slot and said part on said frame comprises a horizontal rod which is received in said V-slot to lock said carriage against horizontal movement when in the elevated position.

16. The combination of claim 14 wherein said carriage comprises a vertically extending base portion in each toasting compartment, said U-shaped members being pivotally connected to said base portions, an integrally formed yoke portion interconnecting said base portions and positioned outside of said compartments beyond the end of said frame, a plate on said yoke having an upwardly facing V-slot, a horizontal rod extending outwardly from the end of said frame adjacent said plate, said plate and said rod comprising said interengaging means with said rod seating in said V-slot to lock said carriage against horizontal displacement.

17. The combination of claim 16 wherein said carriage includes a pivotally mounted bread supporting lever in each toasting compartment, each of said supporting levers being carried by a base portion of said carriage, means biasing said supporting levers to upwardly inclined positions, said biasing means permitting said levers to be pivoted to a horizontal position under the weight of a slice of bread, and means connected to said supporting levers to energize said heating elements when bread is placed on said supporting levers.

18. The combination of claim 14 including a thermal motor for raising and lowering said bread carriage, and motion multiplying means drivingly interconnecting said thermal motor and said carriage support lever means, said motion multiplying means including a resilient tension member which permits said carriage to be lowered manually independently of said thermal motor.

19. In an automatic self-lowering toaster, the combination of a housing enclosing heating elements forming a bread toasting compartment, switch means for said elements, radiation responsive control means mounted in said toasting compartment to respond to the temperature of a bread slice being toasted, a bread carriage supported within said toasting compartment for movement between an elevated position and a lowered toasting position, means carried by said carriage and detachably connected to said radiation responsive control means for closing said switch to energize said elements, said last mentioned means engaging said radiation responsive means for cooling purposes on the end of the toasting cycle.

References Cited

UNITED STATES PATENTS

| | | | |
|---|---|---|---|
| 2,332,518 | 10/1943 | Koci. | |
| 2,806,422 | 9/1957 | Koci | 99—331 |
| 2,878,748 | 3/1959 | Stanek | 99—328 |
| 2,950,668 | 8/1960 | Blixrud et al. | 99—329 |
| 3,071,062 | 1/1963 | Turner | 99—329 |

BILLY J. WILHITE, *Primary Examiner.*